United States Patent
Frerichs et al.

(10) Patent No.: US 6,708,454 B1
(45) Date of Patent: Mar. 23, 2004

(54) PIVOT CONNECTOR FOR EXTENDABLE ROOMS

(75) Inventors: Marc Edward Frerichs, Eldridge, IA (US); Paul Edmund Hanser, Tipton, IA (US)

(73) Assignee: HWH Corporation, Moscow, IA (US)

( * ) Notice: Subject to any disclaimer, the term of this patent is extended or adjusted under 35 U.S.C. 154(b) by 0 days.

(21) Appl. No.: 10/063,619

(22) Filed: May 3, 2002

(51) Int. Cl.[7] ............................. E04B 1/346; E04B 7/16
(52) U.S. Cl. .................... 52/67; 294/26.14; 294/26.13; 294/165; 403/65
(58) Field of Search .................... 52/67, 72; 296/26.14, 296/26.13, 165, 171, 175; 403/286, 294, 68, 65

(56) References Cited

U.S. PATENT DOCUMENTS

| | | |
|---|---|---|
| 3,512,315 A | 5/1970 | Vitalini |
| RE32,262 E * | 10/1986 | Stewart .................... 296/165 |
| 4,950,100 A * | 8/1990 | Horgas ...................... 103/65 |
| 5,577,351 A | 11/1996 | Dewald, Jr. et al. |
| 5,706,612 A | 1/1998 | Tillett |
| 5,787,650 A | 8/1998 | Miller et al. |
| 5,902,001 A * | 5/1999 | Schneider et al. ........ 296/26.13 |
| 6,052,952 A | 4/2000 | Frerichs et al. |
| 6,109,683 A * | 8/2000 | Schneider .................. 296/165 |
| 6,266,931 B1 | 7/2001 | Erickson et al. |
| 6,290,284 B1 | 9/2001 | Crean |
| 6,293,611 B1 * | 9/2001 | Schneider et al. .......... 296/171 |
| 6,345,855 B2 | 2/2002 | Hanser et al. |
| 6,428,073 B1 * | 8/2002 | Blodgett, Jr. ............. 296/26.14 |

* cited by examiner

Primary Examiner—Carl D. Friedman
Assistant Examiner—Nahid Amiri
(74) Attorney, Agent, or Firm—James C. Nemmers; Ryan N. Carter

(57) ABSTRACT

A supporting structure for vehicles that have an expandable room. Telescoping double tube extension beams are secured to the vehicle structure and combined with hydraulic extension cylinders to move the extendable room from the retracted to the extended position and back again. The inner tube of each extension beam is connected to the outer wall of the extendable room using a pivot connector that includes a mounting plate which has extending from it spaced apart support plates that provide bearing surfaces to support a journal. The journal has a transverse opening extending through it between the support plates, and a connecting member is used to attach the inner tube to the journal and therefore to the room mounting plate.

5 Claims, 4 Drawing Sheets

PIVOT CONNECTOR FOR EXTENDABLE ROOMS

BACKGROUND OF INVENTION

1. Field of the Invention

The invention relates to expandable rooms for habitable structures, especially room structures that are telescopically slideable between retracted and expanded positions for motorized or towed vehicles.

A variety of vehicles are known and used which have a room or room portion that may be moved from a retracted position nested within the vehicle body while the vehicle is moving over the road and then extended when the vehicle is stationary to provide additional internal space. This type of arrangement provides adequate space to accommodate users during transit and keeps the vehicle within regulations that impose width limitations for vehicles while traveling over the road. However, when these vehicles are stationary, they are frequently used for habitation for extended periods of time, and when so used, it is highly desirable to be able to maximize the available living space. Typically, this is done by using hydraulic or electrical power to extend the nested portion of the room out to its expanded position.

2. Description of the Prior Art

The prior art teaches arrangements which allow the floor sections of the vehicle and the extendable room to be at the same height when the room is in its extended position. When in the fully retracted position, the floor of the movable room rests on the stationary floor of the vehicle. One or more extension cylinders are positioned beneath the floor of the vehicle, each extension cylinder powering a double tube arrangement supported by the structural members of the vehicle, with an inner tube connected to the extendable room. When the room is to be extended, the inner tube advanced under power of the extension cylinders moving the room outwardly while maintaining the floor at the same level above the stationary floor of the vehicle. As the inner end of the extendable room approaches its fully extended position, it moves downwardly to its fully extended position with the floor of the extendable room is at the same level as the stationary floor of the vehicle. The extension components are provided with a ramp arrangement to compensate for the drop of the room. An arrangement of such a prior art apparatus is shown in U.S. Pat. No. 6,052,952 entitled "Flat Floor Room Extension".

In addition to the arrangement just described, there are known vehicles which use a double tube arrangement for extending and retracting the expandable room but which do not utilize a ramp arrangement for the extension mechanism. Rather, the inner tube that is telescoped within the outer tube has its outer end attached rigidly to the outer wall of the extendable room, and without any mechanism to compensate for the drop of the room, the structural components will flex sufficiently to compensate for the drop. Although these arrangements are less costly and take up less space because of the elimination of a ramping mechanism, they depend upon the flexibility of the various components to compensate for the drop and rise of the extendable room. Thus, when the room moves from a retracted to an extended position and from the extended position to a fully retracted position, undesirable stress is exerted on the structural components including the connection between the inner tube and the outer wall of the extendable room. Repeated extensions and retractions of the room can therefore produce some deformation of the components and cause misalignment of the room when fully retracted.

It is therefore an object of the invention to provide an improved structure which will provide for a mechanism for extendable rooms that will minimize forces and stresses on the structures involved while still providing a relatively inexpensive structure that requires a minimum of space.

SUMMARY OF INVENTION

The invention includes telescoping double tube extension beams that are secured to the vehicle structure and combined with hydraulic extension cylinders to move the extendable room from the retracted to the extended position and back again. The hydraulic cylinders are mounted inside the extension beams, one end to the outer tube of the extension beam and the other end to the inner tube of the extension beam. The inner tube is connected to the outer wall of the extendable room using a pivot connector that includes a mounting plate which has extending from it spaced apart support plates that provide bearing surfaces to support a journal. The journal has a transverse opening extending through it between the support plates, and a connecting member is used to attach the inner tube to the journal and therefore to room mounting plate, the connecting member also serving to retain the journal in place between the supporting plates.

DETAILED DESCRIPTION

Figure 1:
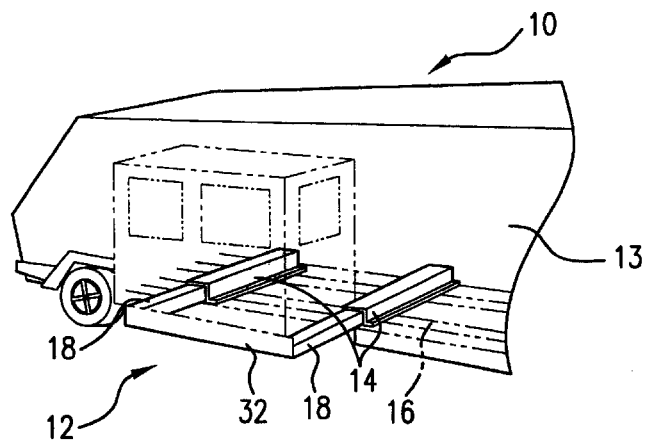
FIG. 1 is a perspective view of a representation of a vehicle with an extendable room showing the room in the extended position and illustrating the basic supporting structure for the extendable room.

Referring first to FIG. 1, there is illustrated a motor vehicle such as a recreational vehicle or coach 10 that has extending from its left side an extendable room indicated generally by the reference numeral 12. FIG. 1 shows the extendable room 12 in its extended position in which it provides additional living space inside of the coach while the coach is stationary. As is well known to those skilled in the art, when the coach 10 is traveling over the road, the extendable room 12 is retracted and nested within the coach body so that the outer wall 32 of the extendable room 12 is flush with an exterior wall 13 of the coach 10. As illustrated in FIG. 1, the extendable room 12 is supported in part by extension beams, indicated generally by the reference numeral 14, that are affixed to the coach frame members 16. The beams 14 are preferably hollow, box-shaped members, and each has an outer tube 26 and a movable inner tube 28 telescoped inside the outer tube 26. The inner tubes 28 have their outer ends affixed to the extendable room 12 in the manner described hereinafter for movement of the room 12 inwardly to a retracted position and outwardly to an extended position. It will be understood by those skilled in the art that the extendable room 12 typically is supported and moved by at least a pair of spaced apart extension beams 14 as illustrated in FIG. 1, but in some applications, a single one of the beams may be used to support and extend the room 12.

Figure 2:
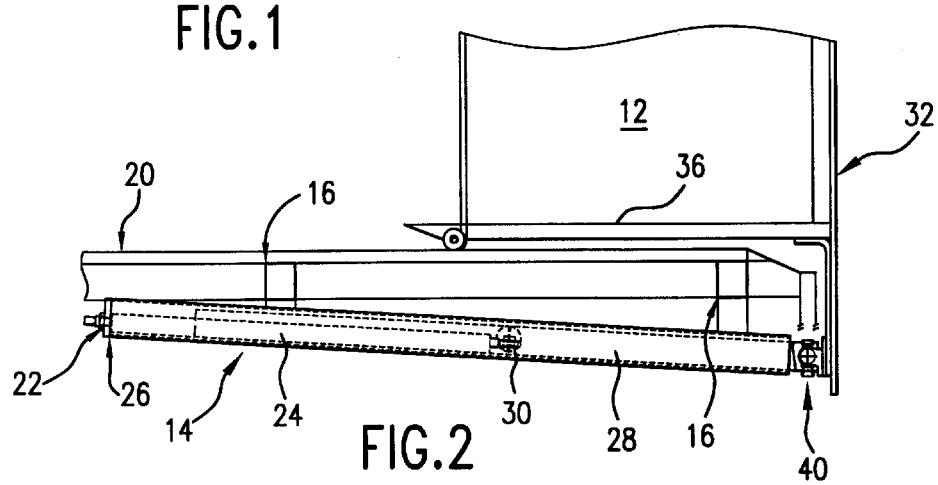
FIG. 2 is a side elevational view, partly broken away, to show the relationship between the components for extending the room, the figure showing the extendable room in a partially extended position.
Figure 3:
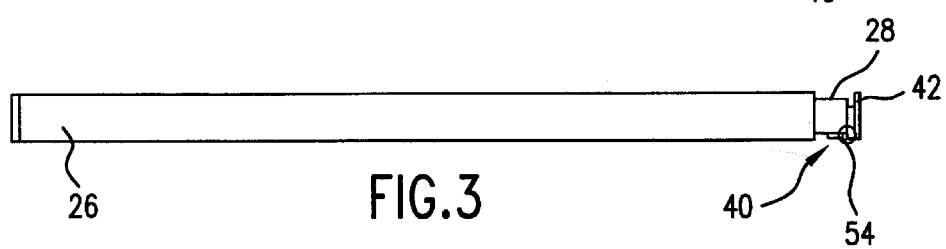
FIG. 3 is a side elevational view of the telescoping tube construction and the pivot connector.
Figure 4:
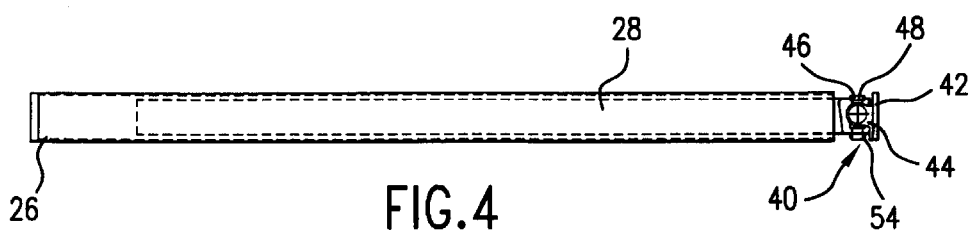
FIG. 4 is side elevational view of the structure of FIG. 3 with parts broken away.
Figure 5:
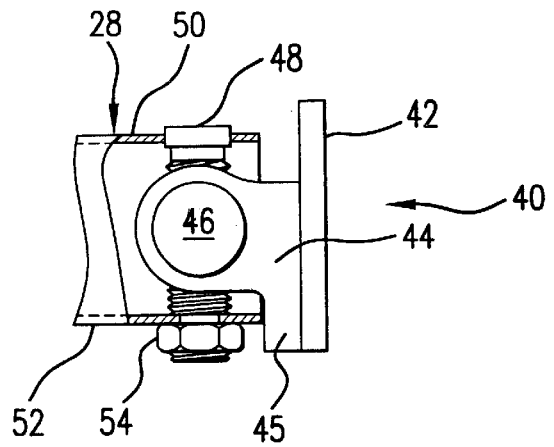
FIG. 5 is an enlarged elevational view of the pivot connector.
Figure 6:
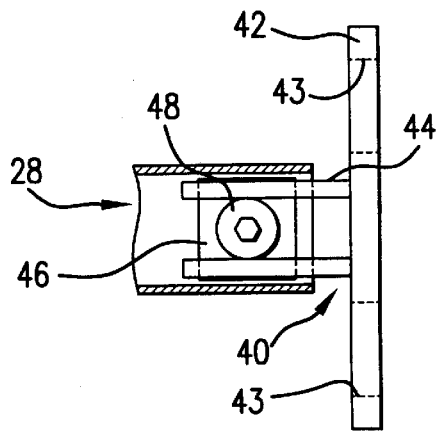
FIG. 6 is a top view of the pivot connector of FIG. 5.
Figure 7:
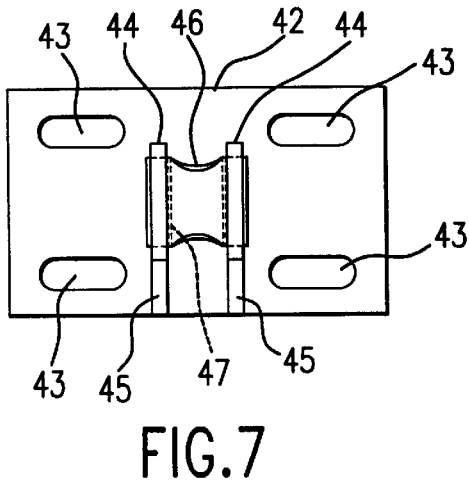
FIG. 7 is a rear elevational view of the pivot connector with the threaded connector not shown.

As illustrated in FIG. 2, the coach frame members 16 are affixed to and support the coach floor 20. The extension beams 14 are affixed to the frame members 16 at an outwardly and downwardly extending angle as illustrated in FIG. 2. Each of the extension beams 14 contains a hydraulic cylinder 24 that is attached at its outer end 22 in any suitable manner to the outer tube 26. The outer tube 26 telescopically receives the inner tube 28 such that the inner tube 28 is moveable inwardly and outwardly relative to the outer tube 26 by the operating rod 30 of hydraulic cylinder 24 which is attached to the inside of the inner tube 28.

Figure 8:
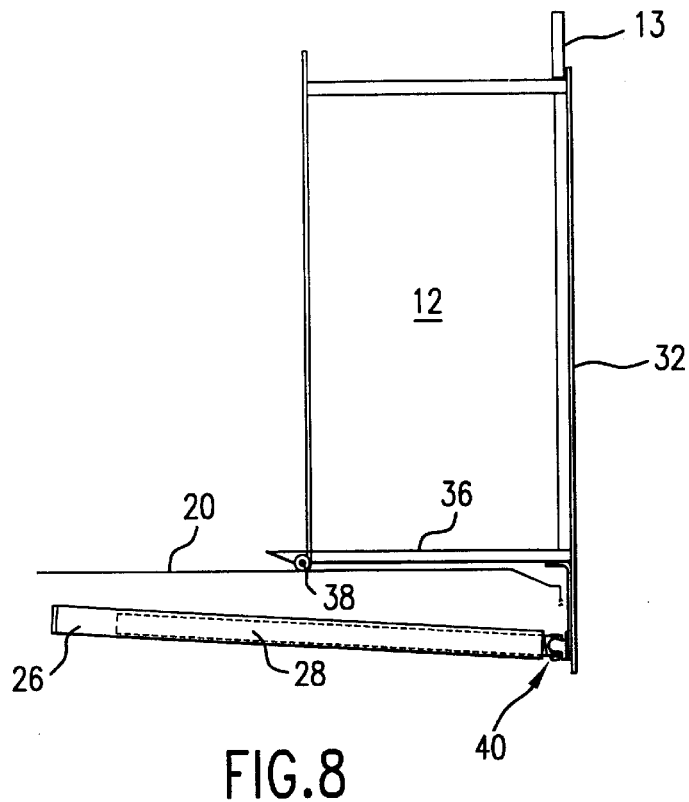
FIG. 8 is a representation to illustrate the extendable room in a fully retracted position and showing the telescoping tube construction and its connection to the extendable room.
Figure 9:
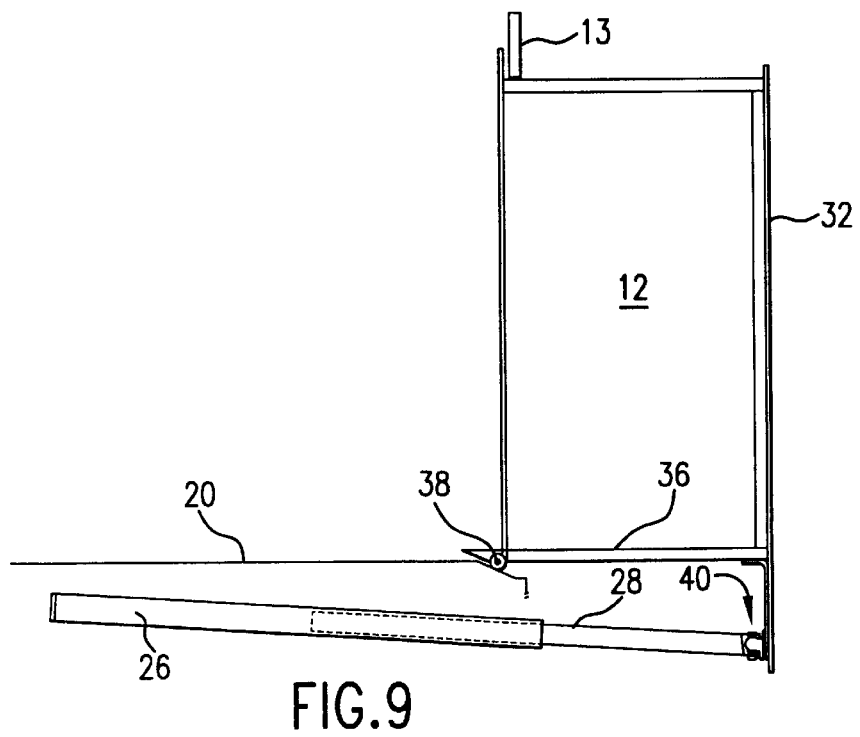
FIG. 9 is an elevational of view similar to FIG. 7 and showing the extendable room in a nearly fully extended position.
Figure 10:
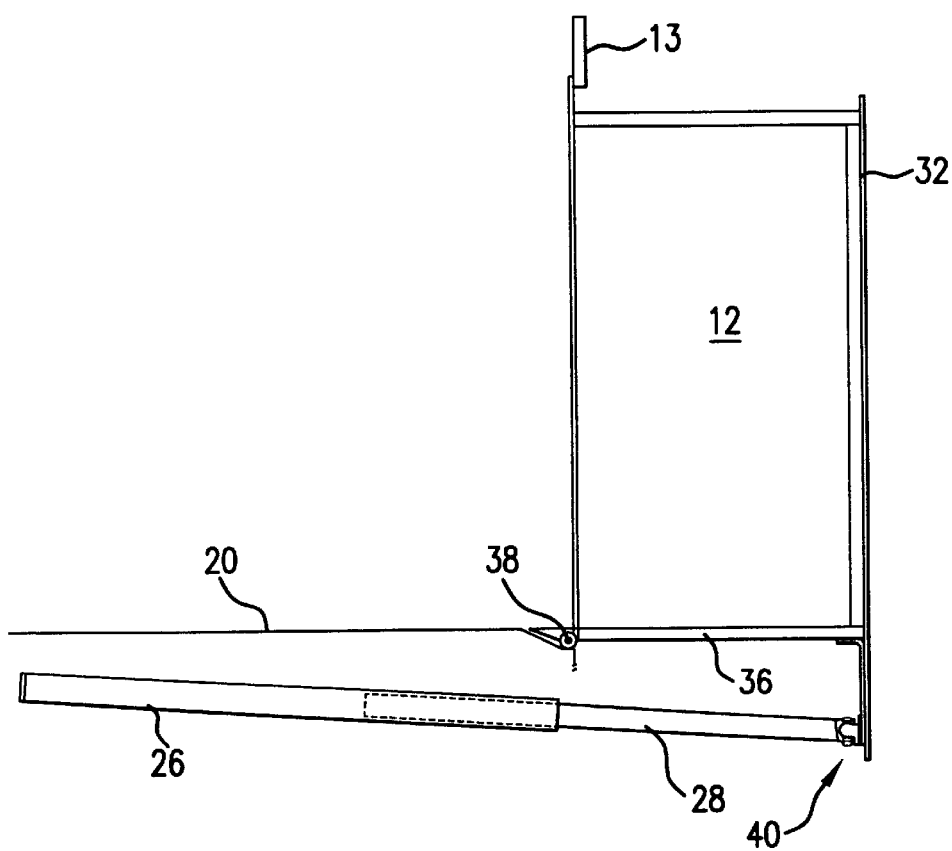
FIG. 10 is an elevational view similar to FIGS. 7 & 8 and showing the representation of the extendable room in a fully extended position.

The outer end of the inner tube 28 is attached to the inside surface of the outer wall 32 of the extendable room 12 by the pivot connector 40 described hereinafter. As illustrated in the representations of FIGS. 8, 9 & 10, the outer wall 32 of the extendable room 12 is aligned with the outer wall 13 of the coach 10 when the extendable room 12 is in its fully retracted position as illustrated in FIG. 8. As is well known to those skilled in the art, the extendable room 12 is supported on suitable rollers 38 that ride on the floor 20 of the coach 10 as the room 12 moves from the fully retracted position to the fully extended position shown in FIG. 10.

As best seen in FIGS. 2–7, the outer end of the inner tube 28 is connected to the outer wall 32 of the extendable room 12 by a pivot connector indicated generally by the reference numeral 40. Pivot connector 40 has a mounting plate 42 having openings 43 that receive fasteners (not shown) for securing the connector to the outer wall 32 of the extendable room 12. The mounting plate 42 supports two spaced apart side plates 44 that extend inwardly from the mounting plate 42. The side plates 44 have downwardly extended legs 45 and have aligned openings that provide bearing surfaces for a journal 46 that turns about a horizontal axis. Journal 46 has a transverse opening 47 formed in it to receive a connector 48. The inner end of the inner tube 28 contains corresponding openings in its upper wall 50 and lower wall 52 so that the connector 48 can be inserted through the openings in the upper wall 50 and lower wall 52 when those openings are aligned with the opening in the journal 46. When so assembled, connector 48 is secured with a threaded nut 54, assuring that the inner tube 28 will be securely attached to the pivot connector 40. Thus, as the extendable room 12 is moved from a retracted to an extended position or from an extended to a retracted position, the pivot connector 40 will allow a limited amount of pivotal movement around the pivot bearing 46 thereby minimizing the stress forces on the connection. The legs 45 of the pivot connector 40 serve to limit the amount of pivotal movement of the room 12 by engaging the lower tube wall 52 (see FIG. 5). This limitation of the pivotal movement keeps the room 12 from rocking when the room is fully retracted.

The pivot connector 40 shown and described herein also allows for quick and easy assembly and connection of the inner tube 28 to the outer wall 32 of the extendable room 12. The outer end of the inner tube 28 merely needs to be positioned so that the side plates 44 extend inside of the inner tube 28 with the openings in the upper wall 50 and lower wall 52 in alignment with the opening in the journal 46. The connector 48 is then simply inserted through the openings and secured in place by the nut 54. When more than one extension beam 14 is used, connector 48 is preferably threaded through the journal 46 as illustrated in the drawings. This will compensate for slight differences in the relative positions of the beams 14 and assure a tight seal of the room 12 with the coach body when the room is fully retracted. It also be understood that although hydraulic cylinders 24 are disclosed as the power means for moving the extendable room 12, pneumatic cylinders, electrical actuators and manually operable mechanisms could also be used in an appropriate application.

From the foregoing described construction, it will be evident that the invention provides a simply and relatively inexpensive connection that can be quickly and easily assembled during the manufacture of the extendable room. By providing for limited pivotal movement at the connection of the inner tube to the extendable room, forces are minimized and any dynamic force is practically eliminated thus assuring the reliability of the connection.

Having thus described the invention in connection with the preferred embodiment thereof, it will be evident to those skilled in the art that various revisions can be made to the preferred embodiment without departing from the spirit and scope of the invention. It is our intention however that all such revisions and modifications that are evident to those skilled in the art will be included within the scope of the following claims.

What is claimed is:

1. A supporting structure with an enclosed space having a frame structure supporting outer walls and a stationary floor and an expandable room moveable outwardly from a retracted position to an extended position so as to expand the useable space of the enclosed space, said supporting structure comprising: an extension beam having an inner tube and an outer tube with the inner tube having an upper wall, a lower wall, and side walls and further being movable relative to the outer tube, the outer tube being affixed to the frame structure to provide support for the expandable room, the inner tube being telescopically mounted inside of the outer tube and operatively connected to the expandable room; power means operatively connected to the outer tube and the inner tube to extend and retract the inner tube relative to the outer tube and thereby move the expanded room from a retracted position to an extended position; a pivot connector connected between the inner tube and the expandable room; said pivot connector including a mounting plate providing for attachment of the pivot connector to the expandable room, spaced apart side plates extending from the mounting plate toward the inner tube, the side plates having downwardly extending legs, the legs being engageable with the lower wall of the inner tube when the room is fully retracted, a journal turnable about a horizontal axis turnably supported by the side plates, the journal having a transverse opening through it, and a connector connected to the inner tube and extending through the opening in the journal to provide for limited pivotal movement of the extension beam and the expandable room.

2. The supporting structure of claim 1 wherein the powers means is hydraulically powered.

3. The supporting structure of claim 1 in which the inner tube is a rectangular tube with an upper wall, a lower wall and side walls, and the connector is connected to the upper and lower walls.

4. The supporting structure of claim 1 in which the connector is a threaded member, and a nut secures the connector to the inner tube.

5. The supporting structure of claim 1 wherein the transverse opening in the journal is threaded and the entire length of the connector is threaded so that the connector's position relative to the journal can be changed by turning the connector within the journal's transverse opening.

* * * * *